April 13, 1943. P. A. RICHARD 2,316,622
FUSELAGE OF AIRCRAFT
Filed Dec. 21, 1939 3 Sheets-Sheet 1
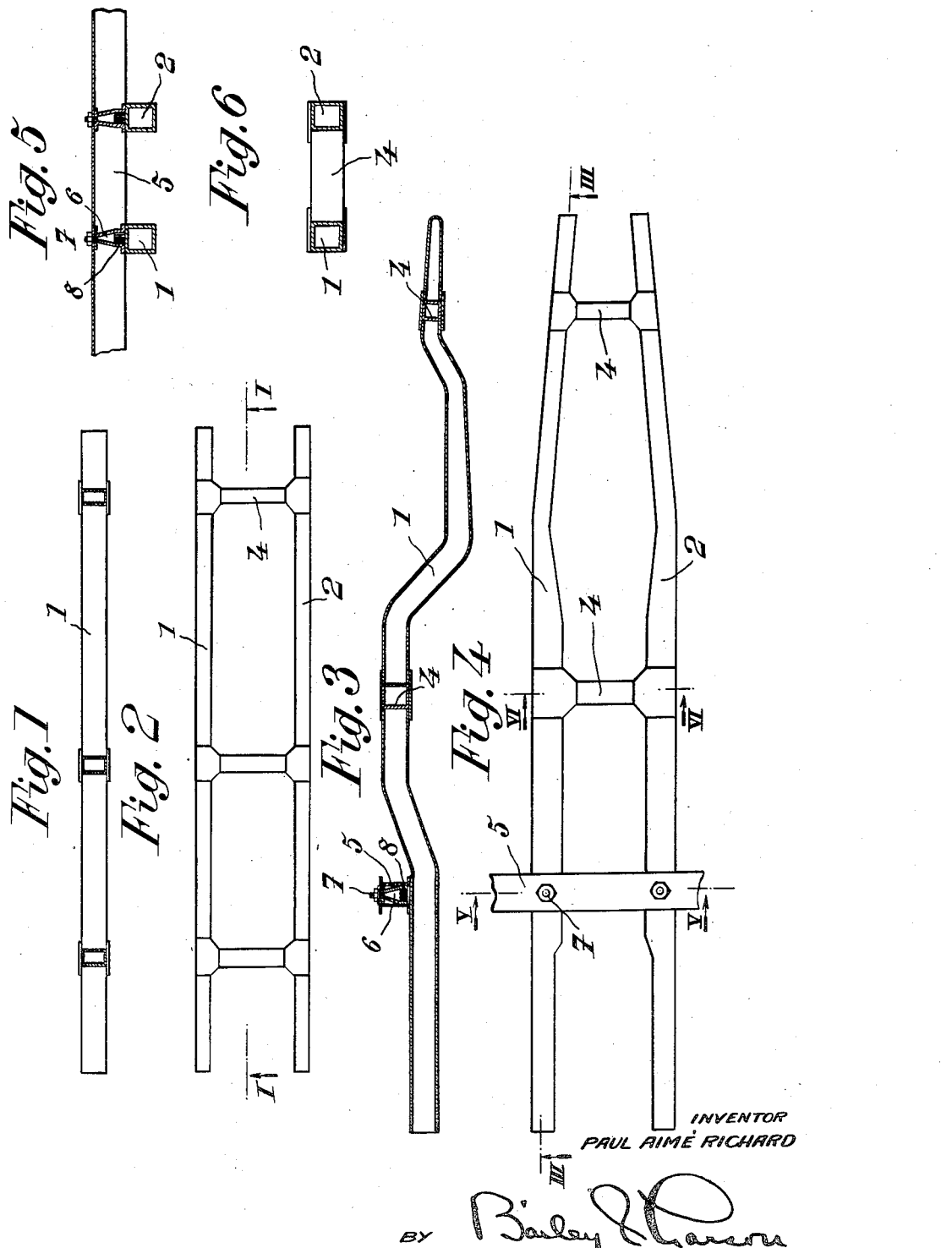
INVENTOR
PAUL AIMÉ RICHARD

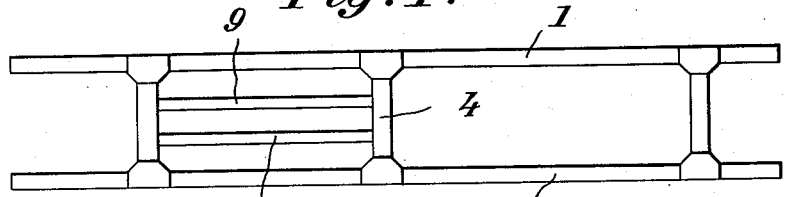
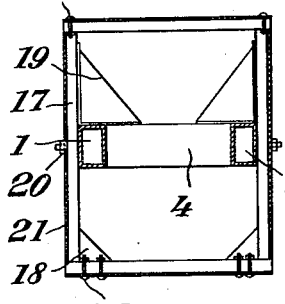
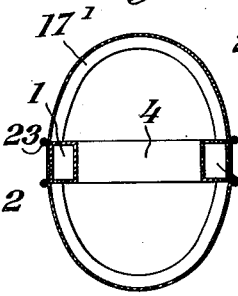
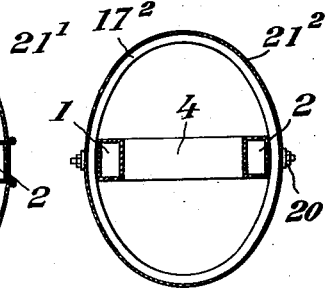
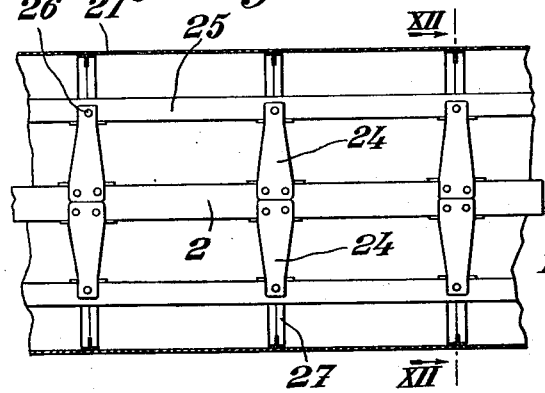
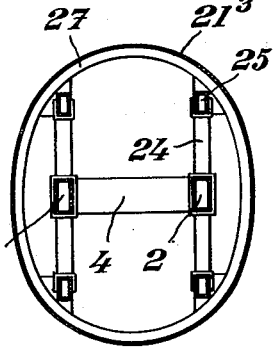
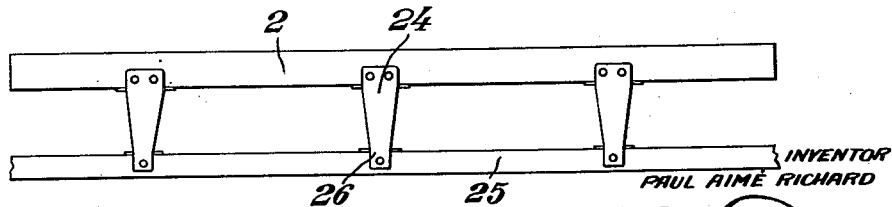

April 13, 1943.　　　P. A. RICHARD　　　2,316,622
FUSELAGE OF AIRCRAFT
Filed Dec. 21, 1939　　　3 Sheets-Sheet 3
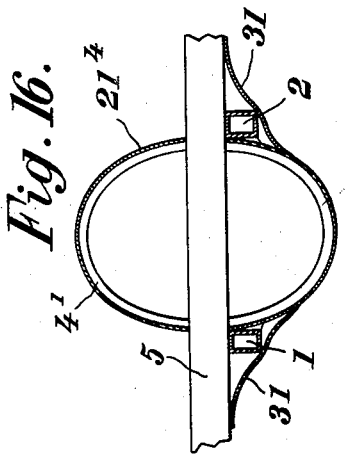
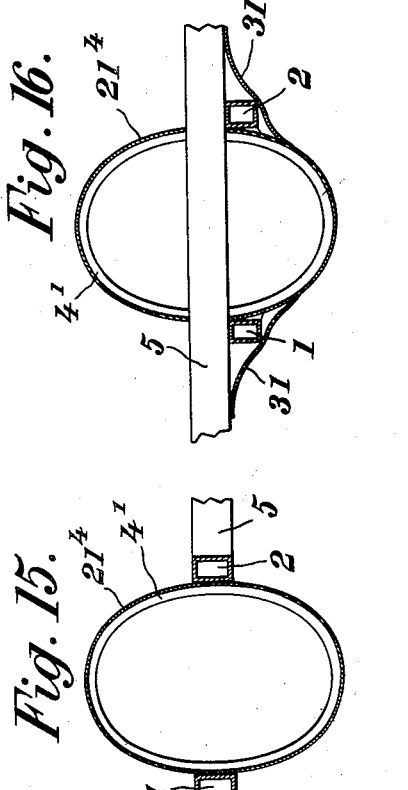
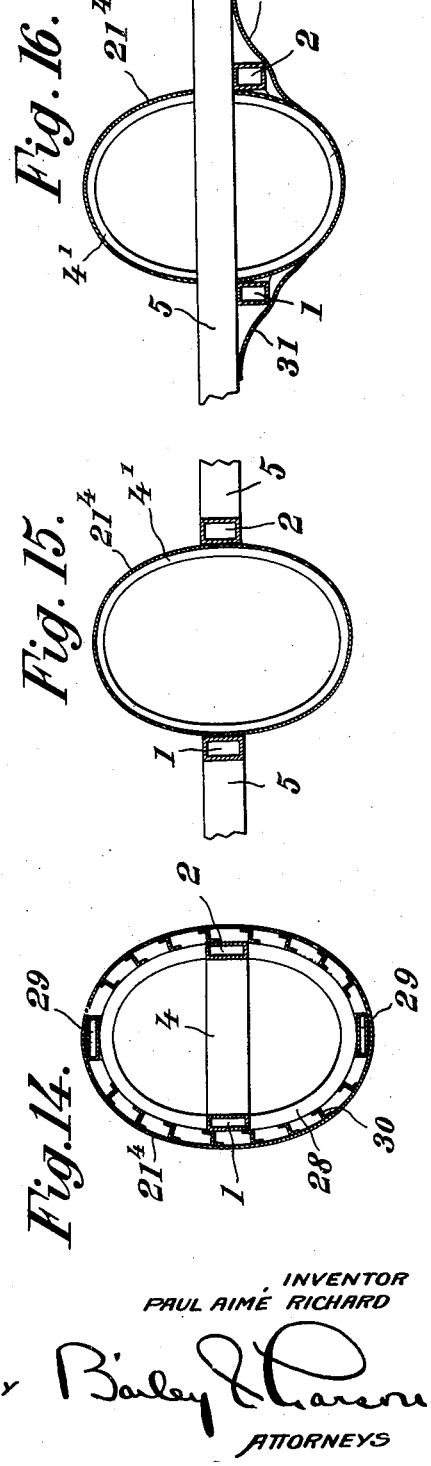
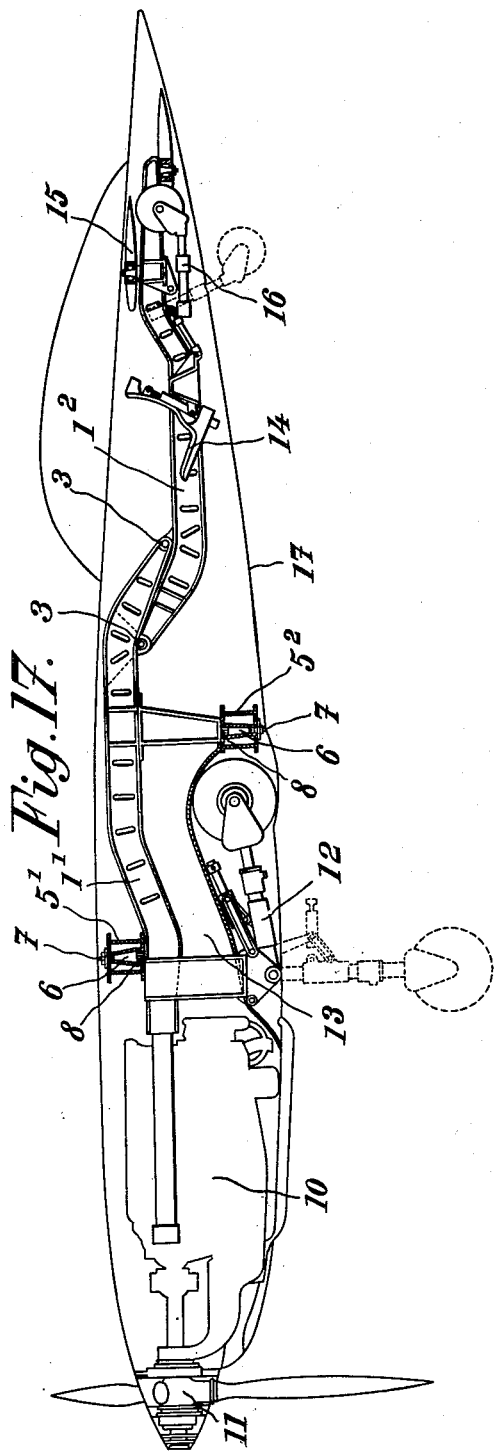
INVENTOR
PAUL AIMÉ RICHARD
BY
ATTORNEYS

Patented Apr. 13, 1943

2,316,622

UNITED STATES PATENT OFFICE

2,316,622

FUSELAGE OF AIRCRAFTS

Paul Aimé Richard, Clichy, France; vested in the Alien Property Custodian

Application December 21, 1939, Serial No. 310,427 In Luxemburg December 13, 1938

5 Claims. (Cl. 244—119)

The present invention relates to the fuselages of aircrafts, and it is more especially, although not exclusively, concerned with fuselages for airplanes or seaplanes.

The chief object of the present invention is to provide a fuselage of this kind which is of simplified construction and of a strength greater than that of ordinary fuselages.

According to an essential feature of the present invention, the stress-resisting skeleton of the fuselage is constituted by a chassis-frame adapted individually to support the essential elements of the aircraft, in a manner analogous to what takes place in automobile vehicles.

Other features of the present invention will result from the following detailed description of some specific embodiments thereof.

Preferred embodiments of the present invention will be hereinafter described, with reference to the accompanying drawings, given merely by way of example, and in which:

Fig. 1 is a longitudinal sectional view on the line I—I of Fig. 2 of the main member of the stress resisting skeleton of a fuselage made according to a first embodiment of the present invention;

Fig. 2 is a plan view, corresponding to Fig. 1, of the same member;

Fig. 3 is a longitudinal sectional view, on the line III—III of Fig. 4, of the main member of the stress resisting structure of a fulselage made according to a second embodiment of the present invention;

Fig. 4 is a plan view, corresponding to Fig. 3, of the same member;

Fig. 5 is a transverse sectional view on the line V—V of Fig. 4;

Fig. 6 is a transverse sectional view on the line VI—VI of Fig. 4;

Fig. 7 is a diagrammatic plan view of a frame for a fulselage made according to another embodiment of the invention;

Fig. 8 is a diagrammatic transverse section of a fuselage made according to the present invention corresponding to three distinct species;

Fig. 9 is a view similar to Fig. 9 corresponding to another species;

Fig. 10 is a similar view corresponding to still another species;

Fig. 11 is a diagrammatic elevational view of a part of the skeleton of a fuselage made according to another embodiment;

Fig. 12 is a sectional view on the line XII—XII of Fig. 11;

Fig. 13 is a view, similar to Fig. 11, showing a portion of a skeleton of the same kind made according to a modification;

Fig. 14 is a diagrammatic sectional view analogous to Fig. 12 showing still another modification of the structure according to the present invention;

Fig. 15 is a transverse sectional view similar to Fig. 14 and relating to another modification;

Fig. 16 is a similar view corresponding to still another modification;

Fig. 17 is a vertical axial sectional view of an airplane fuselage, together with the essential parts supported by said fuselage, the whole being made according to the invention.

In the following description, it will be supposed that the invention is applied to the construction of an airplane fuselage.

The stress-resisting element of the skeleton of the fulselage is constituted, according to the present invention, by a rigid chassis-frame, analogous to that of an automobile vehicle and playing the same part. This chassis-frame includes two longitudinal members 1 and 2, connected together by cross-members, these longitudinal members being located on either side of the vertical axial plane of the fuselage. These members are made either of rectilinear shape, as shown by most of the figures of the drawings, or of any other suitable shape. In the latter case, they are constituted, advantageously, of several rectilinear, or even curvilinear, portions, having different respective directions with respect to a horizontal plane (as in the embodiment of Fig. 17, and/or with respect to a vertical plane (as in the embodiment of Figs. 3 and 4), in such manner that the shape of the chassis-frame can be adapted to that of the fulselage and that said chassis-frame can act as support or form housings for certain essential parts of the airplane.

The transverse section of each of the longitudinal members or beams 1 and 2 is given a shape and size which may be uniform over the whole length of said member, in the embodiment of Figs. 1 and 2. The shape and size of this transverse section may also vary along this length, as in the embodiments of Figs. 3, 4 and 17, the variation being calculated in accordance with the conditions of resistance and available space to be complied with. The transverse section of each beam, either reinforced or not, may be solid, box-shaped, or in a general way, of any other suitable shape chosen in accordance with conditions of resistance and stability to be complied with.

Each longitudinal beam or member may be constituted by a single complex structure or by several such structures, which overlap one another or are engaged in one another. These structures may also be made in juxtaposition one behind another, being assembled together by suitable assembly means.

Fig. 17 shows an arrangement of the last mentioned kind, including two beam elements $1^1$ and $1^2$ which can be made separately, and are fixed together by overlapping assembly and connection through pins or bolts 3.

Concerning the cross members which connect beams 1 and 2 together, they can be constituted by elements such as 4. In the embodiments of Figs. 2 and 6, these cross-members act exclusively as bracing means. Cross members may also be constituted by portions of the main frame member 5 of the airplane wing, the direction of said wing frame member being substantially at right angles to that of members 1 and 2. In a general manner, according to the present invention, I make use, if this is advantageous, of any element of the wing structure or the like which is transverse to the fore-and-aft direction of the airplane. Examples of this last mentioned arrangement are given by Figs. 4 and 5 and also Fig. 17, in which member $5^1$ is located above the chassis-frame and member $5^2$ is located below.

When the cross members consist of elements such as 4, they are connected to the longitudinal beams 1 and 2 of the chassis-frame in such manner as to be fixed and engaged therein in all directions, which gives the whole of the chassis-frame a ladder-like beam shape, whereby beams 1 and 2 have their twisting stresses conjugated.

When the cross connection between the longitudinal members is ensured, in particular, by one or several beams 5 belonging to the wing structure, the connection between the elements 1 and 2 of the frame can be ensured in a permanent or removable manner.

Figs. 5 and 17 show, by way of example, a removable assembly system in which use is made of supports 6 permanently fixed on the external faces of members 1 and 2, each support being provided at its upper end with a threaded part adapted to receive a holding nut 7. Furthermore, each of these supports is provided, over at least a portion of its length, with engagement means, consisting for instance of ribs 8 which engage in corresponding housings provided in the respective wing elements 5, $5^1$ or $5^2$ which act as cross members for the chassis-frame. Such an arrangement prevents any relative movement of said last mentioned wing elements with respect to the longitudinal girders 1 and 2 parallelly to the fore and aft direction. Each of these supports 6 is made of a height and a rigidity sufficient for supporting and opposing bending movements or transmitting torsional stresses which can be produced in the chassis-frame.

As shown by Fig. 7, the chassis-frame may be eventually reinforced, by providing between the cross members auxiliary longitudinal elements such as 9, which may run either along the whole length of the chassis-frame or on the contrary over a portion of the length thereof.

The chassis-frame made as above described is adapted to carry not only the cockpit or cabin of the fuselage, as it will be hereinafter explained but also important elements of the airplane, these elements being connected to said chassis-frame at points the number of which should be as reduced as possible, in order to facilitate the mounting of said elements and, inversely, the removal thereof from the fuselage.

In the embodiment illustrated by Fig. 17, the main front part of the chassis-frame (girders $1^1$) supports, preferably through the intermediate of a cradle, the whole of the motor 10 and of the propelling means 11. It also supports the landing gear 12, which may be of the retractable type or not, and the fuel and lubricant tanks, housed for instance in portion 13 of the fuselage. The rear, or secondary, part of the chassis frame, consisting of girder $1^2$ (which, as above stated, can be assembled and fitted with the parts it supports independently of the main part), is adapted to carry the pilot's cabin, the tail unit 15 together with the controls, eventually the guns or the like, and also the rear wheel 16, which may be retractable or not.

Concerning the walls of the fuselage, that is to say the covering which constitutes the skin of said fuselage, they are constituted by panels or the like which are given any suitable transverse section. For instance, in the embodiment of Fig. 8, the fuselage is of square section, and in the embodiments of Figs. 9 and 10, it is of elliptic section. These covering means may be either permanently fixed to the frame or removably assembled thereon.

For instance, in the embodiment of Fig. 8, the panels are fixed through the medium of rectangular frames 17, suitably stiffened by means of gussets 18 and reinforcements 19. These transverse frames are secured to the external faces of horizontal and longitudinal girders 1 and 2 by means of bolts. As for the panels 21, which are made of a curvature corresponding to that of the cross section of the fuselage, they are connected, for instance by means of bolts or screws 22, to the respective frames 17.

In the embodiment illustrated by Fig. 19, there are rounded half frames $17^1$, fixed on either side of the chassis frame, that is to say above and below it, and these half-frames are mounted on the longitudinal girders in a detachable manner, for instance through the medium of longitudinal pins 23.

In the third embodiment, illustrated by Fig. 10, the transverse frames $17^2$ are of elliptical shape and surround the chassis frame, being secured to the outer faces of the longitudinal girders 1 and 2. The panels forming the covering of the fuselage, to wit elements $21^2$, are kept in position by means of bolts 20 or the like.

In any of the above mentioned examples, the transverse frames supported by the chassis-frame, may constitute a portion of the covering panels before the assembly of the parts.

When the panels forming the skin of the fuselage are supported in any of the manners above described, they can be arranged and calculated in such a way that they cooperate in ensuring the resistance of the whole of the fuselage for supporting the stresses to which the latter is subjected under the effect of the load of the engine and under flying conditions. In this case, the connecting means, such as 20, 22, and 23, to be provided between the covering panels, their intermediate supports, that is to say the transverse frames, and the main chassis-frame, are calculated accordingly.

In order that the covering panels or the like may contribute to the resistance of the whole against bending and torsional stresses, and in order that these stresses may be transmitted more easily to said panels, the latter may be connected to the parts of the chassis-frame by means of vertical arms 24. These vertical arms may extend both above and below the horizontal plane of main girders 1 and 2, as in Figs. 11 and 12, or only below said horizontal plane, as in Fig. 13. These vertical arms are rigidly assembled with respect to said girders, and their free ends are interconnected by longitudinal members 25. These longitudinal members 25 are assembled with the vertical arms through pivots 26, or alternately through a rigid assembly. In this embodiment of the invention, the chassis-frame is provided with auxiliary vertical beams located either at the top part of said chassis frame, or at the bottom part thereof, or both under and above it. With such a structure, the median part supports the bending stresses, while the external part resists the tractive and compression stresses. On the free ends of these auxiliary beams, I fix the panels 21³ which constitute the covering of the fuselage, stiffening rings such as 27 being either provided or not.

I obtain an analogous result by having recourse to the arrangement illustrated by Fig. 14. In this embodiment of the present invention, I fix to the longitudinal girders 1 and 2 of the chassis-frame transverse ring-shaped frames 28, which are stiffened from one to the other by means of longitudinal elements constituted by girders 29, extending between them and provided, in particular at the upper part and the lower part of the skeleton. I further provide supporting elements 30, in such manner as to form a kind of streamlined cage, of elliptic or other cross-section. On these longitudinal elements, I secure the covering panels 21⁴, through suitable means. The ring-shaped transverse frames may be integral with said panels.

In the embodiment of Figs. 15 and 16, the transverse rectilinear bracing members or cross-members, such as 4, above mentioned are replaced by transverse ring-shaped elements 4¹ suitably secured to the longitudinal girders 1 and 2 and which support panels 21⁴ or are integral therewith.

With such an arrangement, I obtain a tubular structure the inside of which is free from any obstruction, at least over a part of the length thereof.

It will be readily understood, from Figs. 15 and 16, that the above mentioned ring-shaped transverse frames may be located in any suitable manner between longitudinal girders 1 and 2. If use is made of the wing elements 5, as above explained, for imparting to the fuselage structure the desired rigidity and strength, these wing elements 5 may be arranged in such manner as to bear on the external lateral faces of longitudinal girders 1 and 2. Such an arrangement is illustrated by Fig. 15. In this case, the inside of the fuselage is wholly unobstructed and ring-shaped elements 21⁴ support the connection stresses between girders 1 and 2.

In another arrangement according to the invention, illustrated by Fig. 16, the wing elements 5 are arranged to bear on the same girders along their top faces. In this case, said girders 1 and 2 may be hidden by covering elements 31, of suitable streamlined shape. In this case, the wing elements 5 extend across the fuselage.

Whatever be the particular embodiment that is chosen, the structure and operation of the system according to the present invention result sufficiently clearly from the preceding description for making it unnecessary to enter into further explanations.

The fuselage according to my invention complies to the conditions above set forth, and it permits of assembling separately the elements of the airplane structure, according to the modern method of construction. Also, it should be noted that, with an arrangement such as above described, the removal and replacement of individual pieces is made extremely easy, since the chassis-frame constitutes a whole which is resistant by itself and on which the various parts are mounted in an independent manner.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an airplane fuselage, a girder construction comprising a pair of elongated girder members, one of said members including an intermediate portion and an end portion bent with respect to the intermediate portion, the other of said members also including an intermediate portion and an end portion bent with respect to the intermediate portion, and means securing the end portions of said members together in overlapping relationship whereby said intermediate portions extend substantially parallel to one another, said means comprising pin fastening means on the overlapped ends of each of said members and cooperating bracket means at the bend of each of said members between said end and intermediate portions for receiving said pin fastening means for rigidly securing the girder members together.

2. In an airplane fuselage, a girder construction comprising a pair of elongated, substantially identical girder members, each of said members being comprised of a substantially straight intermediate portion, a first end portion bent from said intermediate portion so as to extend at an obtuse angle thereto, and a second end portion having an inner part bent at an obtuse angle from said intermediate portion and an end part bent from said inner part so as to extend substantially parallel to said intermediate portion, and means securing said members together with said first end portions in overlapping relationship so as to dispose said intermediate portions in substantially spaced, parallel planes, said securing means comprising cooperation pins and brackets on each of said members.

3. In the combination claimed in claim 1, said girder construction being disposed in said fuselage so that the intermediate portion of one of said members is disposed higher than the intermediate portion of the other of said members, means on the free end of said first mentioned member mounting an airplane motor, landing gear support means, and a transverse wing supporting member, and means dependent from the intermediate portion of said first mentioned member mounting a second transverse girder of the wing support.

4. In the combination claimed in claim 2, said girder construction being disposed so that said first mentioned of said members substantially forms an inverted U, first transverse wing support means secured on the top of the end part of said first mentioned member, means mounting an airplane motor and landing gear support means on the last-mentioned end part, and means dependent from the intermediate portion of said forward member mounting second transverse wing support means.

5. In the combination claimed in claim 2, said girder construction being disposed so that the one of said members substantially forms an inverted U, first transverse wing support means secured on the top of the end part of said last mentioned member, means mounting an airplane motor and landing gear support means on the last-mentioned end part, means dependent from the intermediate portion of said last mentioned member mounting second transverse wing support means, means on the top of the end part of the other member mounting transverse appendage support means, and means dependent from the second end portion of said other member mounting tail skid means.

PAUL AIMÉ RICHARD.